F. W. CASTLE.
FISHING REEL.
APPLICATION FILED JUNE 29, 1912.
1,115,282.
Patented Oct. 27, 1914.
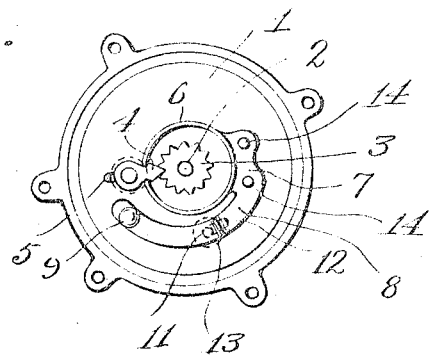
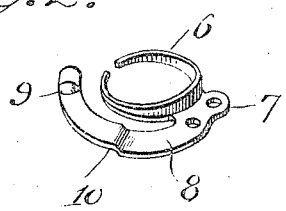
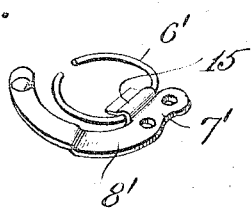
Inventor
Frederick W. Castle
Witnesses

UNITED STATES PATENT OFFICE.

FREDERICK W. CASTLE, OF AKRON, OHIO, ASSIGNOR TO THE ENTERPRISE MANUFACTURING COMPANY, OF AKRON, OHIO, A CORPORATION OF OHIO.

FISHING-REEL.

1,115,282.  Specification of Letters Patent.  Patented Oct. 27, 1914.

Application filed June 29, 1912. Serial No. 706,705.

*To all whom it may concern:*

Be it known that I, FREDERICK W. CASTLE, a citizen of the United States, residing at Akron, in the county of Summit, State of Ohio, have invented new and useful Improvements in Fishing-Reels, of which the following is a specification.

My invention relates to fishing reels, and particularly to that class which are provided with a so-called click and a drag, and has for its object to provide an improved construction of the same wherein said click and drag are so formed as to be capable of being fastened in position by a common means, said parts being preferably formed integral.

In the accompanying drawing: Figure 1 is an inside view of the outer or back plate of a reel constructed in accordance with my invention. Fig. 2 is a detail perspective view of the preferred form of my improved click and drag. Fig. 3 is a view similar to Fig. 2, showing a slightly modified construction.

In the said drawing the reference numeral 1 denotes the outer plate of a reel of conventional construction, on the usual spool shaft 2 of which is mounted the toothed click wheel 3, with which is adapted to be engaged the usual click finger 4 which yields to the movement of said wheel, but drops from one tooth to another so as to produce a clicking sound. Said finger 4 is carried by the usual button on the outside of plate 1 and the two are movable in elongated slot 5 toward and from contact with toothed wheel 3 in the usual manner. The point of finger 4 is held centrally by a ring-like spring 6, which in the construction shown in Figs. 1 and 2 is formed integral with a base 7, which also has formed integral therewith a spring arm 8 constituting the usual drag spring, the outer end 9 of which is adapted to engage against the end plate of the reel spool to retard the movement of said spool. Said spring arm is bent slightly at approximately its middle at 10, and beneath said bent portion is adapted to be shifted a pin 11 passing through an elongated slot 12 in plate 1 and provided on the outer side of said plate with a suitable button 13 for manipulating said pin either to force outward the free end 9 of spring arm 8 or to permit the later to retract into inoperative position.

In the construction shown in Figs. 1 and 2 it will be observed that the click spring 6, while formed integral with the base 7 and drag spring 8, is bent up at a right angle to the plane of the base and drag spring, whereby the necessary resiliency is obtained. By thus combining the click and drag springs the same may be attached in position by a common set of rivets, and will necessarily be brought conjointly into their proper positions, thereby dispensing with the necessity of separate attachment and adjustment. Furthermore, the device as a whole is less likely to get out of repair, for the reason that, the two springs being connected, the drag spring cannot become loosened or separated from the click spring by reason of imperfect or careless riveting, so as to drop away therefrom and strike the flange of the rotating reel spool.

While the device may be made of spring bronze, brass, or flat steel, still I do not wish to limit myself to any particular character of material.

In Fig. 3 I have shown a slightly modified construction in which the ring-like click spring 6' for the click finger is formed separately of any suitable spring wire and is retained in position by means of a clip 15 formed integral with the base 7', the drag spring arm 8' being formed integral with said base 7'.

Having thus described my invention, what I claim as new and desire to secure by Letters Patent is:

In a fishing reel, a base adapted to be fastened to the reel plate, a drag spring formed integral with said base, and a ring-like click spring also formed integral with said base and bent at an angle to said base.

In testimony whereof, I have hereunto set my hand in the presence of two subscribing witnesses.

FREDERICK W. CASTLE.

Witnesses:
 L. W. GRIFFITHS,
 GEORGE T. KEYS.